United States Patent
Nyhan et al.

(10) Patent No.: US 7,574,374 B2
(45) Date of Patent: *Aug. 11, 2009

(54) SYSTEM AND METHOD FOR EVALUATING AND/OR MONITORING EFFECTIVENESS OF ON-LINE ADVERTISING

(75) Inventors: Nicholas W. Nyhan, New York, NY (US); Ronit Aviv, Holmdel, NJ (US)

(73) Assignee: DynamicLogic, Inc., New York, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 11/687,322

(22) Filed: Mar. 16, 2007

(65) Prior Publication Data

US 2007/0156532 A1 Jul. 5, 2007

Related U.S. Application Data

(63) Continuation of application No. 11/348,717, filed on Feb. 7, 2006, now Pat. No. 7,194,425, which is a continuation of application No. 09/349,650, filed on Jul. 8, 1999, now Pat. No. 7,010,497.

(51) Int. Cl.
*G06Q 30/00* (2006.01)
(52) U.S. Cl. ................ 705/14; 705/1; 705/26; 705/27; 707/102; 707/501; 709/219; 709/217
(58) Field of Classification Search ............. 705/1, 705/14, 26, 27; 707/102, 501; 709/217, 709/219
See application file for complete search history.

(56) References Cited

U.S. PATENT DOCUMENTS

| | | | |
|---|---|---|---|
| 5,724,521 | A | 3/1998 | Dedrick |
| 5,794,210 | A | 8/1998 | Goldhaber et al. |
| 5,838,790 | A | 11/1998 | McAuliffe et al. |
| 5,848,396 | A | 12/1998 | Gerace |

(Continued)

FOREIGN PATENT DOCUMENTS

EP 0875843 A1 11/1998

(Continued)

OTHER PUBLICATIONS

Bill Pietrucha, "Regulations Needed For Children's web sites-four million chi]dren ages two to 17 used online services, nearly double the number of users in 1995)", Newsbytes News Network, p. N/A Jun. 16, 1997.*

(Continued)

*Primary Examiner*—Jean D. Janvier
(74) *Attorney, Agent, or Firm*—Leydig, Voit & Mayer, Ltd.

(57) ABSTRACT

A system and a method for measuring and monitoring effectiveness of on-line advertising are provided. The system and method provide a code attached to, for example, an advertising banner of a company that may advertise goods and/or services of the company. The code provides a signal to a server when the banner is viewed on a computer of a user. Cookie data is transferred by the server to the computer of the user providing information related to viewing of the advertising banner. Surveys are further presented to users to obtain information related to the effectiveness of the advertising for both exposed users and control users.

7 Claims, 2 Drawing Sheets

U.S. PATENT DOCUMENTS

| | | | |
|---|---|---|---|
| 5,848,397 A | | 12/1998 | Marsh et al. |
| 5,937,390 A | * | 8/1999 | Hyodo ........................ 705/14 |
| 5,937,392 A | * | 8/1999 | Alberts ........................ 705/14 |
| 5,948,061 A | | 9/1999 | Merriman et al. |
| 5,960,409 A | * | 9/1999 | Wexler ........................ 705/14 |
| 6,006,197 A | | 12/1999 | D'Eon et al. |
| 6,009,409 A | * | 12/1999 | Adler et al. ................... 705/14 |
| 6,009,410 A | | 12/1999 | LeMole et al. |
| 6,199,106 B1 | | 3/2001 | Shaw et al. |
| 6,366,298 B1 | | 4/2002 | Haitsuka et al. |

FOREIGN PATENT DOCUMENTS

| | | |
|---|---|---|
| WO | WO 97/22074 | 6/1997 |
| WO | WO 97/26729 | 7/1997 |
| WO | WO 97/40514 | 10/1997 |

OTHER PUBLICATIONS

European Search Report, dated Feb. 26, 2003, in corresponding European Patent Application No. 00305694.2, and received Mar. 5, 2003.

"Regulations Needed For Children's Web Sites," Newsbytes News Network, P N?A: Jun. 16, 1997.

* cited by examiner

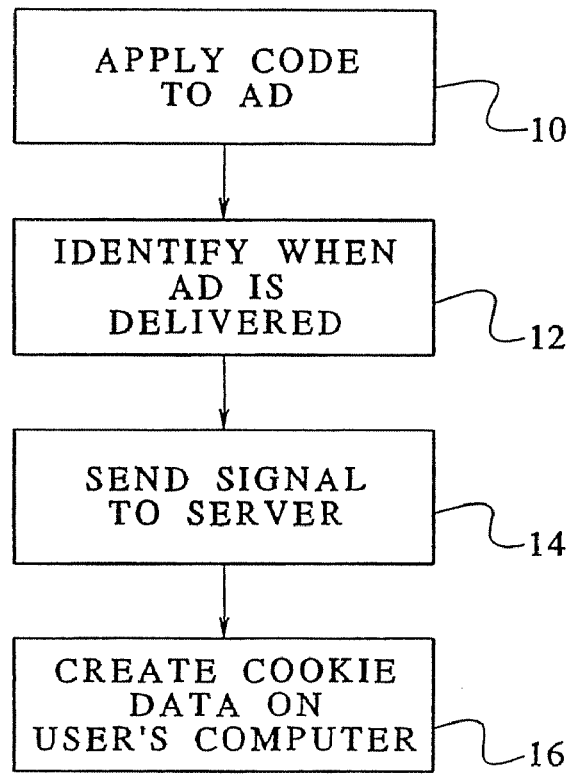
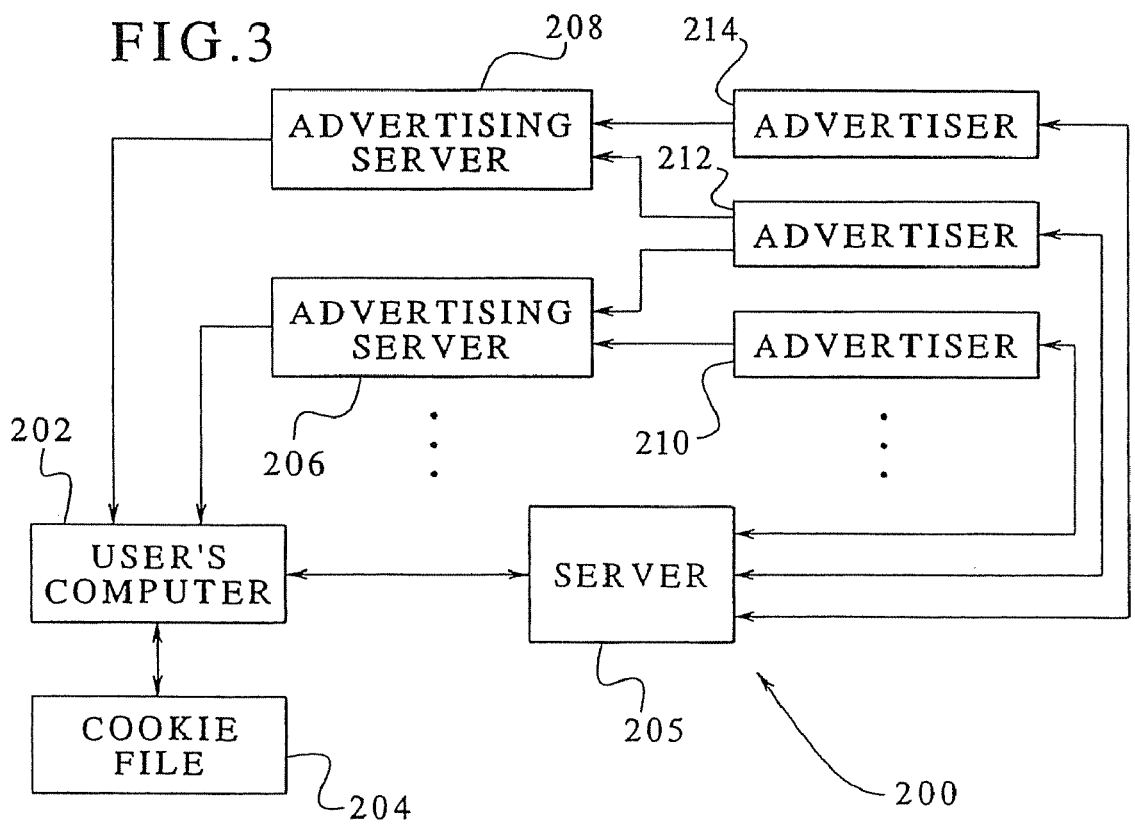

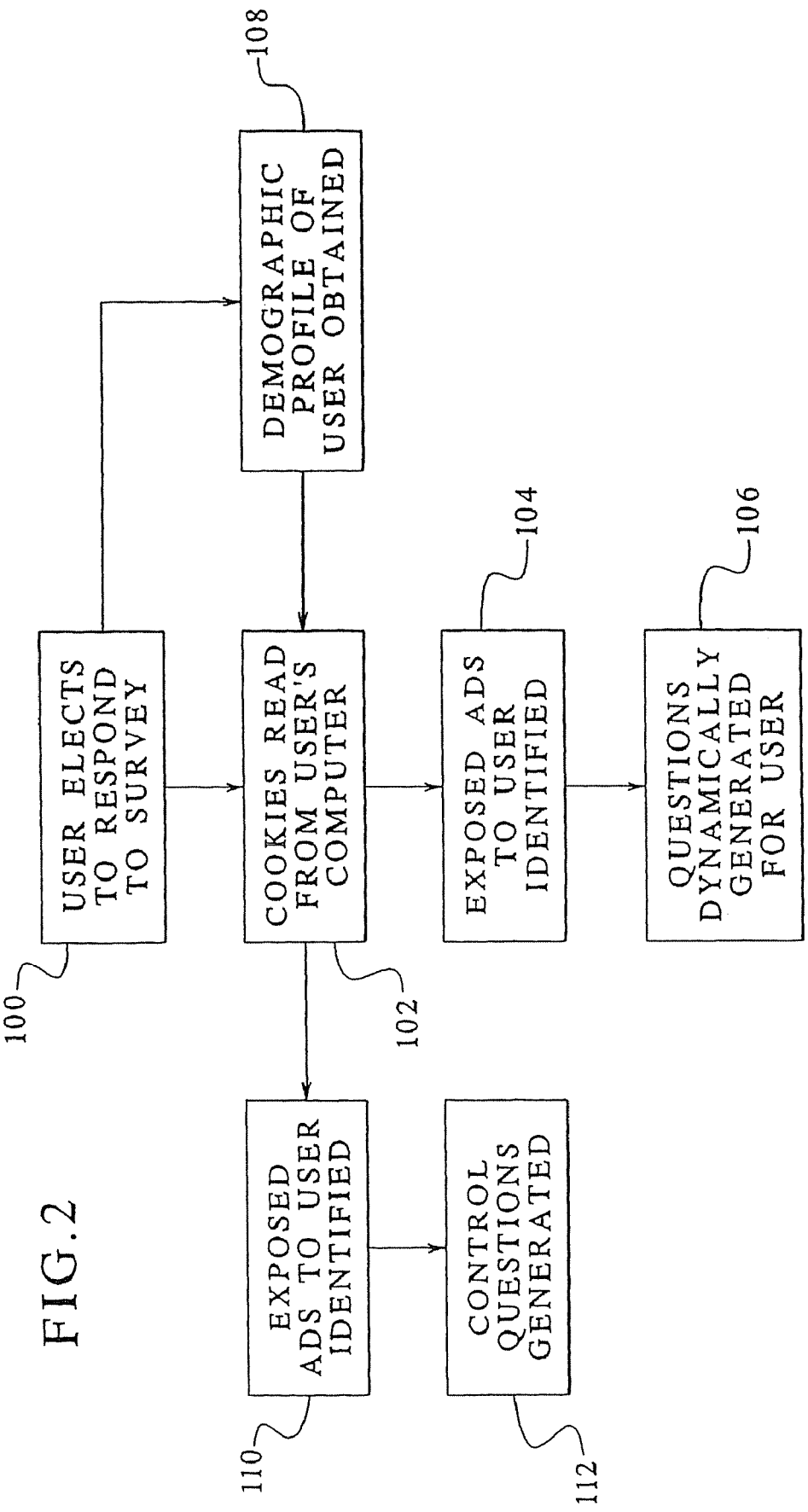

SYSTEM AND METHOD FOR EVALUATING AND/OR MONITORING EFFECTIVENESS OF ON-LINE ADVERTISING

CROSS-REFERENCE TO RELATED APPLICATION

This application claims the priority benefit of Nyhan et al., U.S. patent application Ser. No. 11/348,717, filed on Feb. 7, 2006, now U.S. Pat. No. 7,194,425 which is a continuation of, and claims priority benefit, of Nyhan et al., U.S. patent application Ser. No. 09/349,650 filed on Jul. 8, 1999, now U.S. Pat. No. 7,010,497 entitled "System And Method For Evaluating And/Or Monitoring Effectiveness of On-Line Advertising, "the contents of all referenced patent applications are incorporated herein by reference in their entirety, including any references therein.

BACKGROUND OF THE INVENTION

The present invention generally relates to a system and a method for measuring and/or monitoring effectiveness of advertising. More specifically, the present invention relates to a system and a method for monitoring and/or measuring effectiveness of advertisements, particularly on-line advertising viewed on a computer of a user of the internet.

It is, of course, generally known to advertise specific products and/or services offered by a given company. One form of advertising growing in popularity is advertising via the internet. Many companies purchase what are generally known in the industry as "banners" that a consumer may "click" on to reveal additional information about the product and/or services advertised by the company.

Banners are generally designed to invite and/or incite individuals. to click on the banner thereby revealing additional information regarding the products and/or services of the company. However, the impact that a banner has on an individual, such as a consumer who has viewed the banner, is often difficult to determine or otherwise evaluate. That is, companies currently do not have mechanisms to evaluate the impact that, for example, a banner placed as an on-line advertisement, for example, has on an individual who has viewed the banner and has not necessarily "clicked on" the banner.

The reaction and determination of how consumers react to on-line marketing in advertising is rather limited and is generally limited to consumers' behaviors where consumers have "clicked on" the advertisement. However, a missing piece of data is how people feel about or react to what they have seen or how that exposure to what they have seen has affected their attitude and will motivate them in the future. Particularly, the reaction or influence that an on-line based advertisement has on an individual is important to evaluate to determine the value of the advertisement.

With the increased use of the internet, it can be generally shown that approximately one percent (1%) of all banner advertisements are currently being "clicked on". However, information as to why individuals did not click on the banner or whether the banner has had any effect on the consumer who did click on the banner have not been addressed. Moreover, information and/or data as to why the ninety percent (90%) of the individuals who clicked on the banner did not follow through with a purchase has also not been addressed.

In addition, on-line research is also becoming more and more popular. In fact, in Sep. 17, 1998, *Digital Marketing Services* published a report that indicates that ninety-four percent (94%) of consumers feel that on-line surveys are more convenient than traditional research methods. Moreover, that same article states that the same people participating in traditional forms of market research are now engaging in on-line surveys. On-line surveys are also capturing those not willing to participate in other more traditional survey methods.

On-line research is becoming more popular, and three main benefits are driving the increased usage of on-line research. One benefit is that on-line research is faster, less expensive and more versatile than traditional market research. Moreover, internet advertising will likely increase in importance to advertisers' bottom lines thereby underscoring the necessity of the evaluation of its effectiveness. Finally, traditional research is experiencing declining response rates and consumers have indicated that they prefer the on-line method of research.

A need, therefore, exists for providing a system and a method for monitoring and measuring effectiveness of on-line advertising including monitoring and measuring the effectiveness of those advertisements, particularly on those individuals who have viewed, for example, a banner, but have not necessarily "clicked on" the banner as compared to individuals not exposed to the banner or other advertisement.

SUMMARY OF THE INVENTION

The present invention provides a system and a method for measuring and monitoring effectiveness of advertising. More specifically, the present invention provides a system and a method for measuring effectiveness of on-line advertising, particularly measuring the effectiveness of advertising which is seen or viewed on a computer of an individual via the internet.

To this end, in an embodiment, the present invention provides a system for measuring effectiveness of an advertisement viewed by a user. The system has a code associated with the advertisement received from an advertiser. A server is capable of identifying when the advertisement is viewed by the user wherein the code sends a signal to the server indicative of viewing of the advertisement. A computer on which the advertisement is viewed by the user has a file on which an indicator is generated and the indicator provides information associated with the advertisement.

In an embodiment, the information includes time at which the user viewed the advertisement.

In an embodiment, an advertising server is capable of delivering the advertisement to the computer of the user.

In an embodiment, a plurality of advertising servers are capable of delivering an advertisement to the computer of the user wherein each of the advertisements includes a code associated with the advertisement. The server is further capable of identifying when the advertisement is viewed by the user.

In an embodiment, the server generates a survey that may be accessed by the user.

In an embodiment, the survey is dynamically generated based on advertisements to which the user has been exposed.

In an embodiment, the survey obtains demographic information of the user. This also causes certain questions to be generated.

In an embodiment, the server includes a plurality of categories in which the advertiser may be classified.

In an embodiment, the server generates a survey that may be accessed by the user wherein results of a plurality of surveys answered by a plurality of users assist in computing the effectiveness of the advertisement.

In an embodiment, the server receives questions generated by the advertiser.

In an embodiment, the server receives questions and selected demographic information generated by the advertiser.

In an embodiment, the advertiser may access research results.

In another embodiment of the present invention, a method is provided for measuring effectiveness of an advertisement from an advertiser and viewed by a user. The method comprises the steps of: providing the advertisement viewable through an on-line network accessible by a computer of the user; attaching a code to the advertisement; identifying when the advertisement has been viewed by the user; and storing information in the computer of the user wherein the information relates to viewing of the advertisement.

In an embodiment, a survey accessible by the computer of the user is generated.

In an embodiment, a survey is dynamically generated to the computer of the user based on advertisements to which the user has been exposed.

In an embodiment, survey questions are generated based on information received from the advertisers.

In an embodiment, effectiveness of the advertisement is computed based on survey results obtained from users exposed to the advertisement and from users not exposed to the advertisement.

In another embodiment of the present invention, a system is provided for identifying when an advertisement viewable through an on-line network by a computer of the user has been viewed by the user. The system has a code attached to the advertisement which is capable of generating a signal when the advertisement is viewed on the computer by the user wherein the code provides information relating to the viewing of the advertisement. A server receives the signal from the computer of the user.

In an embodiment, the server generates a signal in response to the signal wherein the signal includes information related to the viewing of the advertisement and is stored on the computer of the user.

In an embodiment, the information includes time at which the advertisement was viewed by the user.

It is, therefore, an advantage of the present invention to provide a system and a method for determining effectiveness of an advertisement.

Another advantage of the present invention is to provide a system and a method for measuring and/or monitoring and/or determining the effectiveness of an on-line advertisement using, for example, a banner in the advertising.

A further advantage of the present invention is to provide a system and a method that simply measures and/or monitors the effectiveness of an advertisement.

A still further advantage of the present invention is to provide a system and a method that adds code to the advertisement of an on-line advertisement that may be stored in a cookie file of a user's computer.

A still further advantage of the present invention is to provide a system and a method for monitoring and measuring effectiveness of an on-line advertisement that is realistic such that advertisers believe the obtained results.

A still further advantage of the present invention is to provide a system and a method for measuring and monitoring effectiveness of an on-line advertisement that may simultaneously serve a plurality of advertisers.

A still further advantage of the present invention is to provide a system and a method for monitoring and/or measuring the effectiveness of a particular advertisement that may be obtained in real time without waiting by the advertiser and that is also flexible to the advertiser.

And, another advantage of the present invention is to provide a system and a method for monitoring and/or measuring the effectiveness of an on-line advertisement that is easy to implement.

A still further advantage of the present invention is to provide a system and a method for monitoring and/or measuring the effectiveness of an on-line advertisement that is not dependent on a single ad server system.

Additional features and advantages of the present invention are described in, and will be apparent from, the detailed description of the presently preferred embodiments and from the drawings.

BRIEF DESCRIPTION OF THE DRAWINGS

FIG. 1 illustrates a flowchart of an embodiment of steps of a method of the present invention.

FIG. 2 illustrates a flowchart of an embodiment of steps of a method of the present invention.

FIG. 3 illustrates a black box diagram of an embodiment of a system of the present invention.

DETAILED DESCRIPTION OF THE PRESENTLY PREFERRED EMBODIMENTS

The present invention generally provides a system and a method for measuring and/or monitoring effectiveness of advertising. More specifically, the present invention provides a system and a method for monitoring and/or measuring effectiveness of on-line advertising, particularly measuring effectiveness of individuals who have viewed a particular advertisement, such as a banner advertisement placed, for example, on the internet that is advertising goods and/or services of a particular company versus those who have not viewed the advertisement.

Two types of on-line research categories are generally known-behavioral research and attitudinal research. Behavioral research is on-line research that uses server logs and "cookie" data. Cookie data is generally known in the art and relates to a file generated on a user's computer by a particular web site. As a result, the web site identifies the user if the user ever re-accesses the web site at a future time. The goal of behavioral research is to attempt to make inferences about what is driving the behavior of the on-line consumer. Essentially, behavioral research identifies and measures where consumers click and what they buy.

Attitudinal research, on the other hand, is considered a next level of detail in on-line research providing psychographic and demographic information as to why consumers do what they do and how they feel about the product or process. When combined with behavioral data, attitudinal research can measure where consumers clicked and how they felt about what they saw, how the images impacted them, whether the exposure to the on-line marketing changed their likelihood to purchase, and what may motivate them to do or buy on-line in the future.

The most common on-line marketing process is to place a banner across a particular web site to draw traffic to another web site, or hopefully, incite a transaction at that second web site. For example, Company A may place a banner advertisement on Company B's web site touting its particular product or service or specific prices or rates that Company A offers. After clicking on the banner advertisement of Company A, the presumably interested consumer may be taken to the web site of Company A where he or she may sign up to receive the particular product or service of Company A. However, only about one percent of all banner advertisements are clicked on by consumers or other individuals viewing the advertisements. Nonetheless, that advertisement, even if not clicked on, may have an impact on or leave an impression on a consumer that is difficult to monitor or evaluate.

The present invention provides companies with mechanisms to evaluate the impact of their particular advertisements, such as a banner advertisement placed on, for example, the internet. Such questions that can be answered are the brand awareness that an advertisement brings to a particular consumer or individual viewing the advertisement, the brand attributes or messages that may be recalled by a consumer or individual that views the advertisement as well as the likelihood to purchase and/or use the goods or services that were advertised by a particular company.

To this end, the present invention provides a survey with questions fed into a pool of questions on an as-needed basis. Multiple advertisers may be able to use the survey to obtain data on the effectiveness of that advertiser's on-line banner advertising campaign. For example, a few key questions may be generated by the survey that may then be posed to hundreds of respondents.

The respondents are divided into two groups, namely an exposed group and a control group. The exposed group consists of individuals' internet protocol (IP) addresses that, according to "cookie data" stored in the computer of the individual, have been exposed to a particular banner of the advertiser. The control group, on the other hand, consists of individuals who, according to "cookie data", have not been exposed to the banner of the particular advertiser. Exposure requires that the banner advertisement is seen on the computer of the individual at some point. If the advertisement is never accessed on the computer of the individual, then that individual is part of the control group as that individual has never been exposed to the advertisement. A statistically relevant number of individuals may then be surveyed in both the control group and the exposed group for comparative purposes.

The survey may be based on standard market research practices. The survey may bring together disparate elements and leverage the strengths of both an on-line research company with an on-line media network. The key is leveraging the "cookie data" and identifying that while one individual may be in the exposed group for one particular advertiser as a result of that individual viewing that advertiser's banner advertisement, for example, that same individual likely may be in the control group for many other advertisers. Therefore, one respondent can fulfill multiple functions in one survey without necessarily impacting the results of the survey.

By the present invention, a respondent is identified as part of a control group or exposed group by attachment of a code to for example, an advertising banner placed on-line by an advertiser. The code is "hidden" on the banner and, preferably, can not be seen by individuals viewing the banner. Preferably, the code is an html format but other codes may also be implemented by those skilled in the art. However, each time a banner advertisement appears having the code on a computer of an individual, a server may be activated by the code. The server delivers a signal, i.e. a "cookie", to the personal computer of the user who has viewed the banner. In addition, an invisible pixel is placed on the banner as a response to the request. Through use of the code attached to the banner advertisement, the server may document every time the advertisement has been seen as well as the time at which the advertisement was seen by a particular user on the computer of the user. Of course, other information may also be incorporated into the documented code. This information is known as "exposure data" and is stored on the personal computer of the user or consumer and is not necessarily stored in the advertising server data base, for example.

On web site pages, for example, on which a banner advertisement appears, a server banner may also be placed recruiting individuals to take part in a survey. Typically, such surveys may require incentives in order to encourage participants. Such incentives may be modified and/or changed as is necessary. When an individual takes the survey, the server may view the cookie file of the computer which the survey participant is using to identify any exposure data on that computer. The server may then select questions for each survey participant based on what exposure data is incorporated or identified in the computer, for example, of the survey participant as well as any demographic profile input by the participant. Accordingly, questions may be dynamically generated by an algorithm that is designed and programmed to insert a higher level of priority questions over lower priority questions based on the exposure data and/or the demographic profile of the individual and/or the cookie data in the computer of the individual and/or the demographic information of the user, for example.

Within the survey, questions and stimuli may be rotated to eliminate order bias associated with traditional surveys. That is, for example, often the first item in a list of items is more likely to be identified as a response to a survey question because of its location in the list. If the questions and the order of the list are, for example, rotated, such bias normally associated with surveys can be substantially eliminated.

Moreover, a control panel may be implemented to allow the system to self-regulate so that as quotas are reached for specific items, the questions may be removed. At any time during the process, advertisers may log in and obtain results of the survey for their own review and determination with respect to the efficiency of the banner advertisement which advertisers placed, for example.

Referring to FIGS. 1-3, FIG. 1 generally illustrates the steps necessary to identify whether a respondent is a controlled user or an exposed user.

To this end, a first step requires the placement of a code directly associated with an advertisement. The code is invisible with respect to the advertisement, but, in certain applications, the code may also be made visible. The application of the code to the advertisement is generally shown in FIG. 1 at step 10. When an advertisement is opened or delivered, the code in the advertisement applied in step 10 may be activated and subsequently identified in step 12. A signal may be sent at step 14 to a server and/or to a database. A cookie may be created on a user's hard drive as shown in step 16 identifying both the advertisement which was opened by the user and a time at which the advertisement was viewed.

As a result of the foregoing steps, when an advertisement is delivered by, for example, advertising server software, the code, such as html code, attached to a banner advertisement sends a call or "ping" to a server and/or a data base. The server and/or database may write a cookie on that user's hard drive of his computer in the user's cookie file. The cookie writes an identification that pertains to the banner to which the user was exposed and creates a log on that user's machine that the user saw a specific advertisement at a specific time. Accordingly, users are "marked" as having seen certain advertisements.

Simultaneously, a separate process may occur as generally shown in FIG. 2. A user must first elect to respond to, for example, an on-line survey as identified at step 100 in FIG. 2. If the user elects to respond to a survey, cookies in the hard drive of the computer of that user may be read as identified at step 102. As indicated at step 104, a determination is made as to which advertisements the user has been exposed to, and at step 106, questions may be dynamically generated for that particular user based on advertisements that the user has been exposed to as determined in step 104.

Alternatively, if a user elects to respond to a survey as shown at step 100, demographic profiles of that user or users may be obtained as shown at step 108. Cookies may also be read in the hard drive of the computer of the user at which point a determination may be made as to which advertisements have been read by the particular user as indicated at step 110. Subsequently at step 112, a set of control questions may be generated based on the demographic profile input by the user and the specific advertisements that have been read by that user. Accordingly, the system and the method of the present invention conducts on-line research to help businesses that use on-line advertising to analyze the effectiveness of their on-line business strategies and advertisements. The on-line research gathers attitudinal data from a target audience of an advertiser, and that data may be augmented with behavioral data to create a richer and more insightful analysis. The target audience may be pre-determined by selected demographic information input by the advertiser identifying demographic requirements of the survey participant.

The survey generation algorithm of the present invention is, therefore, created to form a questionnaire or survey including evaluation questions for a banner advertisement campaign in a manner that fills up requested quotas for a "control" and an "exposed" number of participants in an optimal way. The data that may be used in the algorithm includes, for each banner, the requested number of participants who have not seen the banner (control group size), and for each banner, the requested number of participants who have been exposed to the banner (exposed group size). In addition, for each banner, the current count of participants who answer the questions and who have not seen the banner (control group count), and for each banner, the current count of participants who answer the questions and who have been exposed to the banner (exposed group count). Further, for each banner, the beginning and end dates of the campaign and a "priority" indicator may be provided as data for the algorithm. Preferably, the priority indicator is assigned a value between zero and five. For each banner, the demographic requirement is necessary to be defined for targeting specific participants, and a list of e-mails of the people who participated as control or exposed may also be required. Further, for the participants, a list of banners that the participants were exposed to, the date and time of that exposure, and the demographics provided by the participants at a time of registration is generally necessary data for the algorithm. This information may be necessary for the algorithm to use this data to compute statistically relevant results.

The algorithm is designed such that if the participant is attempting to take the survey and has not been exposed to any of the banners, the participant is not qualified and may not be admitted to the survey. However, for any banner the participant has been exposed to, the participant is counted in the exposed group. For any number of exposed, the algorithm attempts to match one banner to be counted as part of the control group. To find "control" pages within the questionnaire or survey, demographic requirements preferably must match that submitted by the advertiser's demographics requirements. Priority may be given if so required; however, as the end of the time frame for the campaign for the banner advertising closes, or if the quota is lacking, then certain participants may be acceptable in order to establish and meet desired quotas for control and/or exposed groups.

FIG. 3 generally illustrates components of a system 200 of the present invention. A single user is illustrated by a computer 202 having a cookie file 204 associated with a hard drive of the computer 202. A server 205 is capable of generating a signal, "cookie data", in the cookie file 204 of the computer 202 in response to an advertisement sent to the computer 202 from one or more advertising servers 206,208. Although only two advertising servers 206,208 are illustrated, any number of advertising servers may be included in the system 200 of the present invention.

In addition, advertisers 210,212 and 214 are illustrated in FIG. 3. Each of the advertisers 210,212 and 214 may be associated with one or more of the advertising servers 206 and/or 208. The advertisers 210, 212 and 214 provide advertisements, such as banners, to the advertisement servers 206 and/or 208 for subsequent display on any one or more of a plurality of computers, such as the computer 202. The advertisers 210, 212 and 214 may also access and selectively communicate with the server 205 to generate survey questions and pre-determined demographic profiles for their survey respondents. As shown, the advertiser 210 is associated with the advertising server 206; the advertiser 212 is associated with both the advertising servers 206 and 208; and the advertising 214 is associated with the advertising server 208. Of course, the advertisers 210, 212 and 214 may be associated with either one or more of the advertising servers 206 and/or 208 or other advertising servers not illustrated in FIG. 3. Further, only three advertisers are illustrated; however, it should be understood that any number of advertisers may be included in the system 200 of the present invention and may associate with any one or more advertising servers.

As a result, the primary application of the present invention is measurement and evaluation of the impact and effectiveness of on-line advertising. A second application replaces traditional forms of market research on any topic. For example, the system may interview certain professionals about certain aspects occurring within those professions. In such an instance, the internet is not the topic of the research, but merely the vehicle for conducting it quickly, cost-effectively, and globally.

The on-line survey feature of the present invention is capable of handling multiple projects and thousands of respondents simultaneously. This feature administers surveys and is the central repository for all of the respondent or user information. As a result, custom research may be achieved wherein flexible on-line market research services may be tailored to a certain advertiser's specific objectives, such as creative testing and research services. Further, shared research may also be achieved using a continuously running, multi-advertiser methodology in which many advertisers share costs associated with one large survey sample. For example, the present invention provides a cost-effective research application that empowers advertising-supported web sites/networks to quantify the branding impact of their banner advertising, for example, and helps demonstrate value to those companies, for example, that advertise goods and/or services through the internet. The present invention is further capable of demonstrating the value of a particular advertisement beyond "click-through" and the information generated by individuals that have clicked-through the banner of the advertisement in question.

Finally, tracking research is also achieved by the present invention by regularly scheduled research projects that may be front loaded and easily replicated for on-going measurements and/or monitoring thereof. The results of a survey may be obtainable by an advertiser through a web page where the advertiser may log in and see the results of the survey and subsequent research. Typical research results provided to an advertiser may include a "banner-aided awareness" of the user, an "intent to purchase" of the user as a result of viewing of the banner, and "message recall" of the user as a result of viewing of the banner. Results may be tabulated for both an exposed group of users and a control group of users, and the impact of the exposed group versus the control group may be tabulated. An impact quotient may also be calculated. For example, if the percents of aided awareness, for example, between the exposed group and the control group are the same, the impact quotient is one. This is statistically significant at a ninety-five percent confidence level. Such information may be extremely helpful when assessing a specific impact of a campaign and its effectiveness.

Not only is information with respect to the advertiser's banner campaign possible, the advertiser may also obtain a "brand name impact" quotient which may be used as a norm by which the advertiser may compare and track the effectiveness of campaigns in the future. Preferably, a survey banner may be placed into automatic rotation after the banner of the advertiser is served. This ensures that a sizeable exposed group for each particular advertiser with a banner occurs. A survey banner may be placed on the advertising network without any targeting specification. This may likely result in some exposed respondents for selected banner campaigns but may also ensure a sizeable amount of control respondents.

As a respondent or user moves from the network and into the survey, cookie data from the advertising network is transferred. The data base may be read to obtain the cookie data and determine what banners to which they have been exposed. This prompts the data base to gather exposed questions and present those questions. To this end, a respondent may first fill out a basic demographic form at the beginning of the survey. When that data is submitted, the data base prompts control questions for presentation. The data base thereby maximizes the efficiency of each respondent.

As an example, assume a respondent is exposed to an "Alpha Airlines" banner advertisement. First, cookie data may be recorded with respect to that information, and those respondents can be assigned as part of an exposed group. If, for example, the Alpha Airlines banner does not show up in that person's cookie data, then those individuals are assigned as the Alpha Airlines "control" group provided those individuals match the demographics of the target audience preselected by Alpha Airlines, if desired. Alpha Airlines may then want to know if the banner has impacted a respondent's "top-of-mind-awareness" of travel services so questions may include, for example: "From the following list, please pick the top three companies that you would consider using for business travel between Boston and New York." Other questions may be geared towards the gauging of a consumer's sense of brand attributes or positioning statements of Alpha Airlines, for example.

Lastly, Alpha Airlines may want a question about the likelihood of the consumer to purchase Alpha Airline's services. These questions may be separated so that the presence of subsequent questions of Alpha Airlines do not harm the integrity of the first set of "blind top-of-mind" questions. Each advertiser may generate a predetermined set of questions that are necessary to obtain answers to important branding questions. The survey may also contain demographic questions about respondents so that advertisers can obtain that data if requested, for example.

For example, Alpha Airlines may be able to get demographic data detailing the demographic information of a representative sample of people exposed to the Alpha Airlines' banners. The data may be collected and cross-tabulated to create two cells: exposed and control. The exposed cell may consist of a predetermined number of respondents who have been exposed to a specific banner tested. The control cell may consist of a predetermined number of respondents who match the basic demographics but have not been exposed to a specific banner. These respondents may be matched according to the key targeting criteria and comparative criteria between the exposed cell and the control cell may be generated. An advertiser, such as in this case, Alpha Airlines, may view the results of the search and obtain answers to their specific questions. Data may be logged to a custom page in real time and preferably, three columns may be provided: exposed, control, and impact rating. By comparing percentages of respondents between the exposed and the control groups, a number which details the relative impact of that banner may be calculated on an exposed audience. In the "top-of-mind-awareness" category, for example, an impact value of 1.26 means that the exposed group's citation of Alpha Airlines was twenty-six percent higher than that of the control group's citation. This will give advertisers, such as advertisers like Alpha Airlines, a sense of how banners are doing attitudinally not just via "click through."

The metric used to calculate the impact of a particular banner advertisement compares the attitudes of the control and exposed groups. Each segment is asked a question regarding their opinion on a particular topic. For example, the survey may ask which airline a participant would fly if the participant was to purchase a plane ticket in the near future. The percentage of individuals who indicate that they would buy the advertiser's product is the attitudinal yield. By comparing the attitudinal yield of those who saw the banner against those who did not, the impact of the advertisement can be computed by calculating the relative difference:

$C.yield$=Attitudinal yield for control cell $E.yield$=Attitudinal yield for exposed cell $Impact=(C.Yield-E.Yield)/C.yield$ For example, assume a banner advertisement campaign launches, and the C.yield for a likelihood to purchase question is 15%. Further, assume that the exposed cell generates an attitudinal yield of 20%.

The impact may be computed as follows:

$(20\%-15\%)/15\%=33\%.$

The conclusion that may be drawn from this is that the banner advertisement increased likelihood to purchase by 33%.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A system for facilitating measuring effectiveness of advertisements displayed upon a computer for viewing by a user through on-line surveys, the system comprising:

an on-line advertisement, issued by an advertising server, including a code embedded within executable instructions;

a user computer for receiving and executing the on-line advertisement, including the code;

a server, separate and distinct from the advertising server, that supplies an indicator to the user computer for identifying an instance of the on-line advertisement being executed on the user computer, wherein the user computer includes a repository within which the indicator is stored, the indicator providing information associated with the on-line advertisement executed on the user computer; and an on-line survey provider that provides a survey to the user computer and evaluates survey responses in accordance with previous exposure to on-line advertisements indicated by contents of the repository.

2. The system of claim 1 wherein the information includes a time at which the advertisement is executed on the user computer.

3. The system of claim 1 wherein the repository is a file.

4. The system of claim 3 wherein the file is a cookie file.

5. The system of claim 1 wherein the server generates a survey accessible to a user of the user computer wherein results of a plurality of surveys answered by a plurality of users on a plurality of user computers facilitate computing effectiveness of the on-line advertisement.

6. The system of claim 1 wherein the server includes an interface for receiving questions generated by a source of the on-line advertisement.

7. The system of claim 1 wherein the server includes an interface for receiving questions and selected demographic information in association with the on-line advertisement.

\* \* \* \* \*